(12) United States Patent
Yoshioka et al.

(10) Patent No.: US 10,607,398 B2
(45) Date of Patent: Mar. 31, 2020

(54) DISPLAY CONTROL METHOD AND SYSTEM FOR EXECUTING THE DISPLAY CONTROL METHOD

(71) Applicant: COLOPL, Inc., Tokyo (JP)

(72) Inventors: Takanori Yoshioka, Tokyo (JP); Taichiro Shiraishi, Saitama (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/640,774

(22) Filed: Jul. 3, 2017

(65) Prior Publication Data
US 2018/0005431 A1    Jan. 4, 2018

(30) Foreign Application Priority Data

Jul. 4, 2016  (JP) .................................. 2016-132524
Jul. 4, 2016  (JP) .................................. 2016-132525

(51) Int. Cl.
*G06T 15/20*   (2011.01)
*G06F 3/01*    (2006.01)
*G06T 19/20*   (2011.01)

(52) U.S. Cl.
CPC ............ *G06T 15/205* (2013.01); *G06F 3/012* (2013.01); *G06T 19/20* (2013.01); *G06T 2215/16* (2013.01); *G06T 2219/2016* (2013.01)

(58) Field of Classification Search
CPC ... G06T 15/205; G06T 19/20; G06T 2215/16; G06T 2219/2016; G06F 3/012
See application file for complete search history.

(56) References Cited

U.S. PATENT DOCUMENTS

| | | | |
|---|---|---|---|
| 8,665,259 B2* | 3/2014 | McCrae | G06F 3/04815 345/419 |
| 9,473,758 B1* | 10/2016 | Long | A63F 13/497 |
| 9,648,313 B1* | 5/2017 | Henry | H04N 13/383 |
| 10,078,366 B2* | 9/2018 | Ashforth | G06F 3/012 |
| 2011/0244956 A1 | 10/2011 | Sakakibara et al. | |

(Continued)

FOREIGN PATENT DOCUMENTS

| | | |
|---|---|---|
| JP | 2000-172740 A | 6/2000 |
| JP | 2011-215918 A | 10/2011 |

(Continued)

OTHER PUBLICATIONS

Office Action in JP Application No. 2016-132524, dated Nov. 22, 2016, 7 pp.

(Continued)

*Primary Examiner* — Yu Chen
(74) *Attorney, Agent, or Firm* — Hauptman Ham, LLP

(57) ABSTRACT

A display control method for execution by a system including a head-mounted device. The display control method includes generating virtual space data for defining a three-dimensional virtual space. The display control method further includes displaying a visual-field image on the head-mounted device based on a visual field of the virtual space data. The display control method further includes updating the visual-field image in response to a detected movement of the head-mounted device exceeding a threshold. Updating the visual-field image includes changing a scale of an object in the virtual space by adjusting an angular range of the visual-field image.

19 Claims, 16 Drawing Sheets

(56) References Cited

U.S. PATENT DOCUMENTS

| | | | | |
|---|---|---|---|---|
| 2011/0244958 A1* | 10/2011 | Nimura | ............... | A63F 13/5252 |
| | | | | 463/31 |
| 2011/0298823 A1* | 12/2011 | Kitahara | ............... | G06T 19/006 |
| | | | | 345/632 |
| 2012/0169717 A1* | 7/2012 | Nakano | ................. | A63F 13/525 |
| | | | | 345/419 |
| 2012/0176366 A1* | 7/2012 | Genova | ................. | G06T 15/205 |
| | | | | 345/419 |
| 2012/0309518 A1* | 12/2012 | Hansen | ............... | A63F 13/5255 |
| | | | | 463/31 |
| 2012/0309519 A1* | 12/2012 | Hansen | ................... | A63F 13/00 |
| | | | | 463/31 |
| 2016/0187970 A1* | 6/2016 | Ashforth | ................ | A63F 13/00 |
| | | | | 345/8 |
| 2017/0076503 A1* | 3/2017 | Tamaoki | ............... | G06T 19/006 |
| 2017/0148339 A1* | 5/2017 | Van Curen | ............. | G09B 9/003 |
| 2017/0264891 A1* | 9/2017 | Iwasaki | .................. | G03B 35/24 |
| 2018/0188802 A1* | 7/2018 | Okumura | .............. | G06F 3/0487 |
| 2018/0205888 A1* | 7/2018 | Tsukahara | ................ | G09G 5/00 |

FOREIGN PATENT DOCUMENTS

| | | |
|---|---|---|
| JP | 2011-215920 A | 10/2011 |
| JP | 2016-57947 A | 4/2016 |

OTHER PUBLICATIONS

Office Action in JP Application No. 2016-132524, dated Apr. 18, 2017, 4 pp.

* cited by examiner

FIG. 8
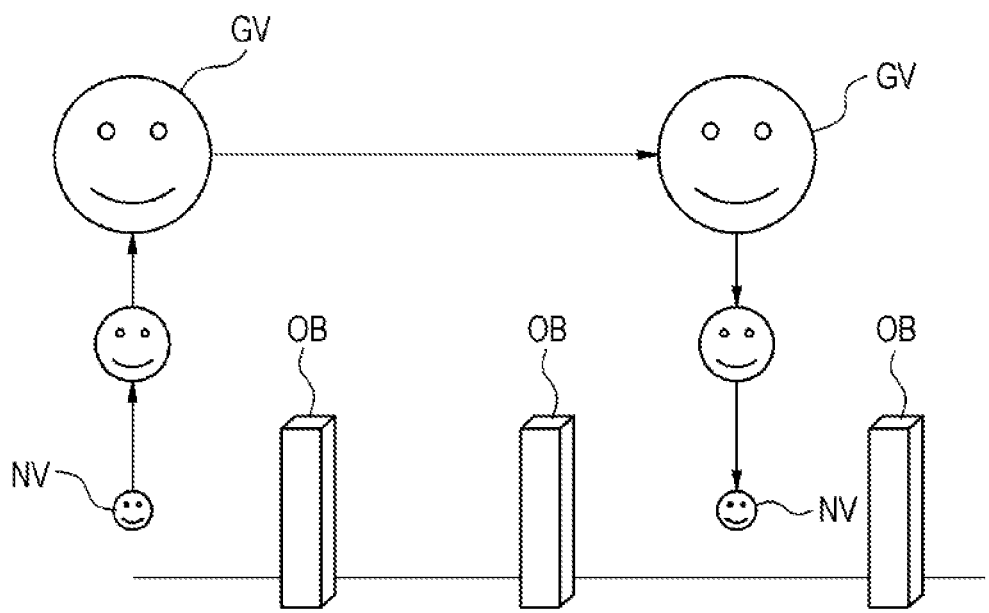
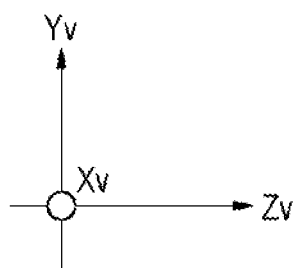

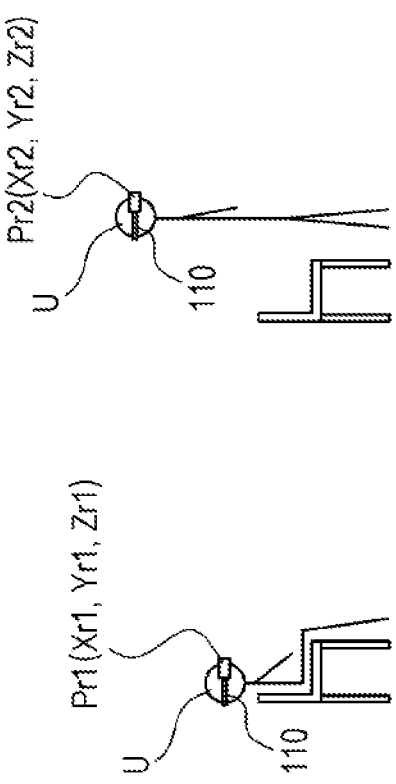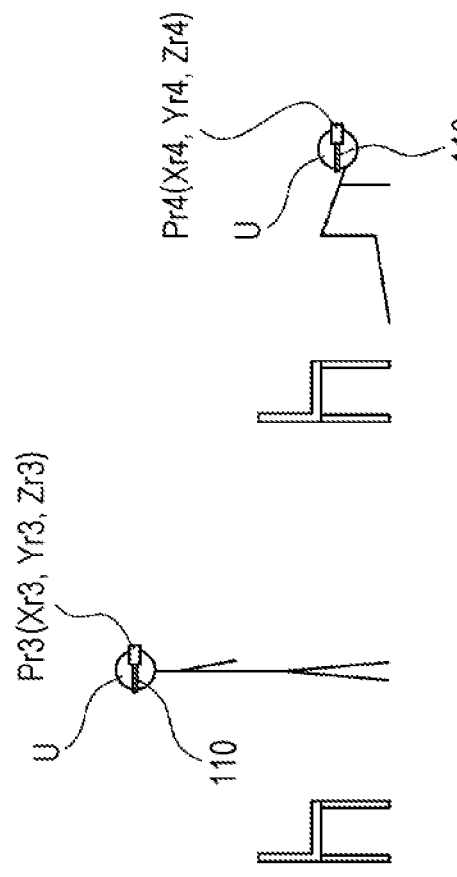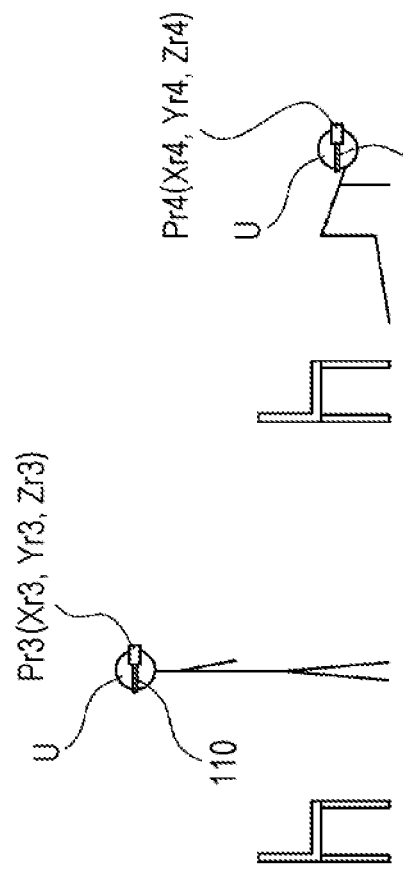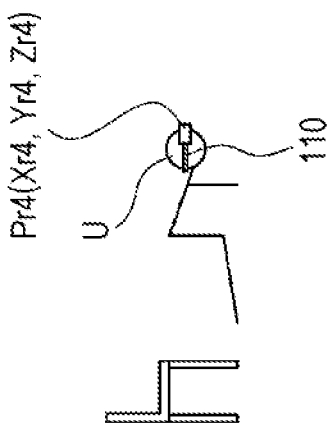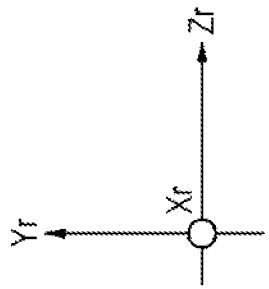

FIG. 15

| CHARACTER ID | CHARACTER ATTRIBUTE | DISTANCE BETWEEN LEFT AND RIGHT CAMERAS (mm) | PARTS ATTRIBUTE | FIELD ANGLE OF VIRTUAL CAMERA (°) | CAMERA SETTING FOR FIRST-PERSON VIEWPOINT | CAMERA SETTING FOR THIRD-PERSON VIEWPOINT |
|---|---|---|---|---|---|---|
| 001 | MEDIUM SIZE | 50 | - | 60 | A | A' |
| 002 | SMALL SIZE | $50-\alpha 1$ | - | $60-\beta 1$ | B | B' |
| 003 | LARGE SIZE | $50+\alpha 2$ | - | $60+\beta 2$ | C | C' |
| 004 | MEDIUM SIZE | $50+\alpha 3$ | LARGE SIZE | $60+\beta 3$ | D | D' |

# DISPLAY CONTROL METHOD AND SYSTEM FOR EXECUTING THE DISPLAY CONTROL METHOD

TECHNICAL FIELD

This disclosure relates to a display control method and a system for executing the display control method.

BACKGROUND

There is known a head-mounted device (HMD), which is worn on a head of a user and is capable of displaying a virtual space image. In Patent Document 1, there is described a design assistance system having a viewpoint information display function for assisting in design of a property, for example, a building, using a virtual space. In Patent Document 1, as means for changing a viewpoint position in real time, in addition to related-art means for allowing a user to operate a group of operation buttons to walk through the virtual space forward/backward or leftward/rightward, there is a description of means for allowing the user to input a viewpoint position using a plan view display unit to instantaneously move the viewpoint position, and to change a visual-field angle to change a scale to be used when a movement amount of the user in a real space is transformed into a movement amount in the virtual space.

RELATED ART

Patent Documents

[Patent Document 1] JP 2000-172740 A

SUMMARY

In the system described in Patent Document 1, a group of operation buttons are operated to change the visual-field angle.

At least one embodiment of this disclosure helps to provide a display control method capable of changing a viewpoint in a manner which is more intuitive than in other approaches for virtual reality (VR) and/or augmented reality (AR) systems. Further, at least one embodiment of this disclosure helps to provide a system for executing the display control method.

According to at least one embodiment of this disclosure, there is provided a display control method, which is executed by a system including a head-mounted device. The display control method includes generating virtual space data for defining a three-dimensional virtual space containing a virtual camera. The method further includes displaying a visual-field image on the head-mounted device based on a visual field of the virtual camera and the virtual space data. The method further includes updating the visual-field image by moving the virtual camera in the virtual space in accordance with movement of the head-mounted device. The method further includes changing a rendering range of the virtual camera when a movement amount of the head-mounted device in an upward/downward direction exceeds a predetermined amount. The method further includes changing a movement amount of the virtual camera with respect to a movement amount of the head-mounted device in a horizontal direction, which intersects the upward/downward direction, when the rendering range is changed.

According to at least one embodiment of this disclosure, the display control method capable of changing the viewpoint intuitively can be provided.

BRIEF DESCRIPTION OF THE DRAWINGS

FIG. 8 A schematic diagram of changing the viewpoint in the virtual space according to at least one embodiment of this disclosure.

FIG. 9A A diagram of coordinates for the HMD in accordance with a position of the user wearing the HMD according to at least one embodiment of this disclosure.

FIG. 9B A diagram of coordinates for the HMD in accordance with a position of the user wearing the HMD according to at least one embodiment of this disclosure.

FIG. 9C A diagram of coordinates for the HMD in accordance with a position of the user wearing the HMD according to at least one embodiment of this disclosure.

FIG. 9D A diagram of coordinates for the HMD in accordance with a position of the user wearing the HMD according to at least one embodiment of this disclosure.

FIG. 15 An attribute information table stored in a storage unit according to at least one embodiment of this disclosure.

DETAILED DESCRIPTION

Figure 1:
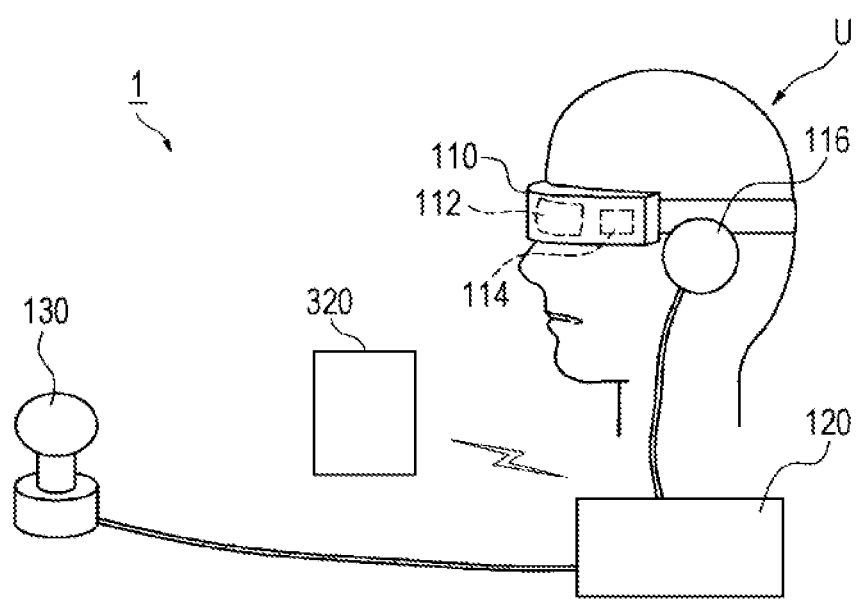
FIG. 1 A schematic diagram of a head-mounted device (HMD) according to at least one embodiment of this disclosure.

The summary of embodiments of this disclosure is described.

(1) A display control method, which is executed by a system including a head-mounted device. The display control method includes generating virtual space data for defining a three-dimensional virtual space containing a virtual camera. The method further includes displaying a visual-field image on the head-mounted device based on a visual field of the virtual camera and the virtual space data. The method further includes updating the visual-field image by moving the virtual camera in the virtual space in accordance with movement of the head-mounted device. The method further includes changing a rendering range of the virtual camera when a movement amount of the head-mounted device in an upward/downward direction exceeds a predetermined amount. The method further includes changing a movement amount of the virtual camera with respect to a movement amount of the head-mounted device in a horizontal direction, which intersects the upward/downward direction, when the rendering range is changed.

According to the above-mentioned method, the viewpoint can be changed more intuitively by the rendering range of the virtual camera changing in accordance with the upward/downward movement of the head-mounted device in comparison with other approaches. Therefore, providing the display control method for a virtual space enabling the user to feel more immersed in the virtual space is possible.

(2) The size of an image acquisition unit of the virtual camera may be changed to change the rendering range.

According to the above-mentioned method, changing the rendering range of the virtual camera with a simple method is possible.

(3) Coordinates of the virtual camera may be corrected such that a viewpoint position of the virtual camera in a visual-axis direction remains constant before and after the change in the rendering range.

According to the above-mentioned method, preventing or reducing unnatural changes of the visual-field image by suppressing change in viewpoint position in the visual-axis direction of when the size of the virtual camera is changed in accordance with the upward/downward movement of the HMD is possible.

(4) The virtual camera may include a left-eye virtual camera and a right-eye virtual camera. The above-mentioned method may further include a step of changing a distance between the left-eye virtual camera and the right-eye virtual camera.

(5) The above-mentioned method may further include a step of changing a field angle of the virtual camera.

According to these methods, changing a range of the visual field more intuitively in comparison with other approaches is possible.

(6) A system according to at least one embodiment of this disclosure is a system for executing the display control method of any one of Items (1) to (5) above.

According to this configuration, providing the system enabling intuitive change of the viewpoint in accordance with movement of the head-mounted device in a predetermined direction is possible.

Embodiments of this disclosure are described below with reference to the drawings. Once a component is described in this description of the embodiments, a description on a component having the same reference number as that of the already described component is omitted for the sake of convenience.

FIG. 1 is a schematic diagram of a head-mounted device (hereinafter simply referred to as "HMD") system 1 according to at least one embodiment of this disclosure. In FIG. 1, the HMD system 1 includes an HMD 110 worn on a head of a user U, a position sensor 130, a control device 120, and an external controller 320.

The HMD 110 includes a display unit 112, an HMD sensor 114, and headphones 116. The headphones 116 may not be included in the HMD 110. Instead, a speaker or headphones separate from the HMD 110 may be used.

The display unit 112 includes a non-transmissive, or partially-transmissive, display device configured to completely cover a field of view (visual field) of the user U wearing the HMD 110. With this, the user U can see a visual-field image displayed on the display unit 112, and hence the user U can be immersed in the virtual space. The display unit 112 may include a left-eye display unit in which an image for a left eye of the user U is projected, and a right-eye display unit in which an image for a right eye of the user U is projected.

The HMD sensor 114 is mounted near the display unit 112 of the HMD 110. The HMD sensor 114 includes at least one of a geomagnetic sensor, an acceleration sensor, or an inclination sensor (e.g., an angular velocity sensor or a gyro sensor), and can detect various movements of the HMD 110 worn on the head of the user U.

The position sensor 130 is constructed of, for example, a position tracking camera, and is configured to detect the positions of the HMD 110. The position sensor 130 is connected to the control device 120 so as to enable communication to/from the control device 120 in a wireless or wired manner. The position sensor 130 is configured to detect information relating to positions, inclinations, or light emitting intensities of a plurality of detection points (not shown) provided in the HMD 110. Further, the position sensor 130 may include an infrared sensor or a plurality of optical cameras.

The control device 120 is capable of acquiring information related to the position of the HMD 110 based on the information acquired from the position sensor 130, and accurately associating the position of the virtual camera in the virtual space with the position of the user U wearing the HMD 110 in the real space based on the acquired information of the position of the HMD 110.

Figure 2:
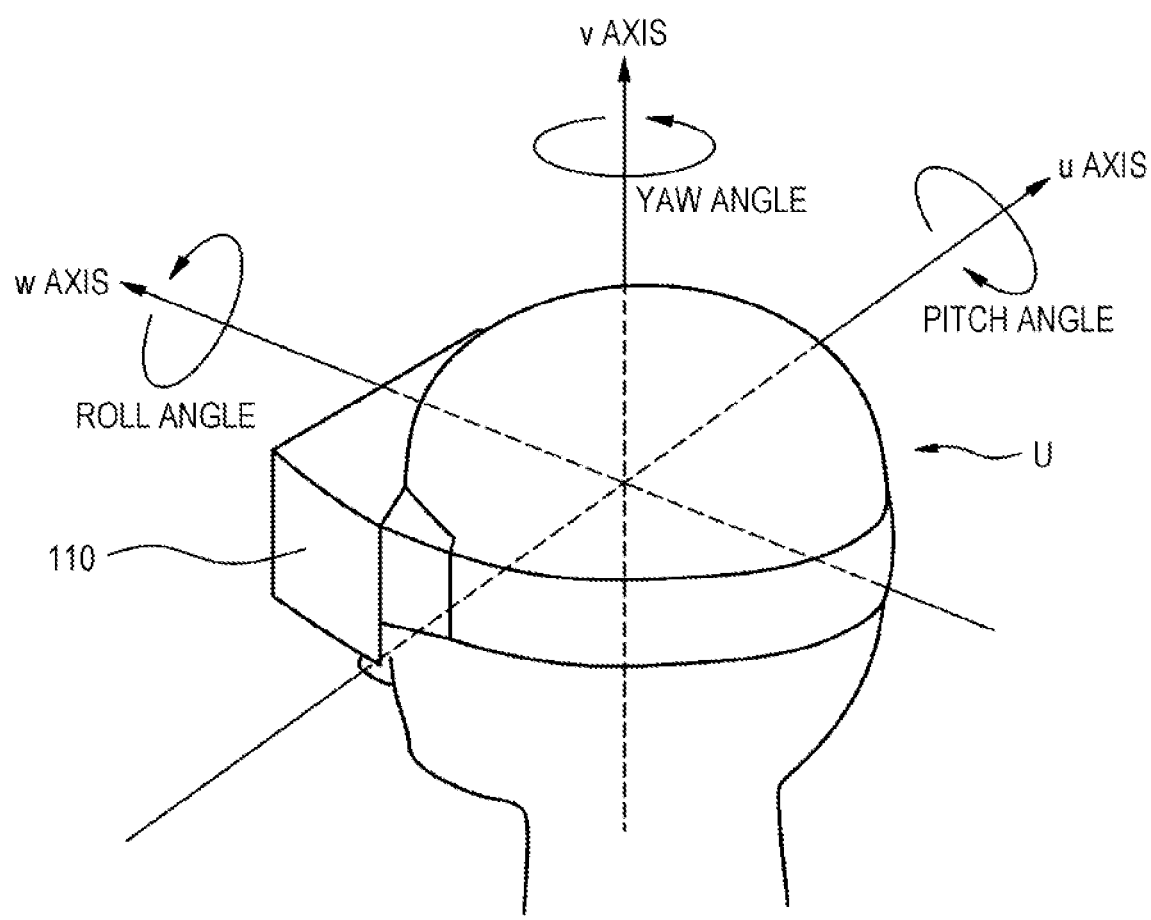
FIG. 2 A diagram of a head of a user wearing the HMD according to at least one embodiment of this disclosure.

Next, with reference to FIG. 2, a method of acquiring information relating to a position and an inclination of the HMD 110 is described. FIG. 2 is a diagram of the head of the user U wearing the HMD 110 according to at least one embodiment of this disclosure. The information relating to the position and the inclination of the HMD 110, which are synchronized with the movement of the head of the user U wearing the HMD 110, can be detected by the position sensor 130 and/or the HMD sensor 114 mounted on the HMD 110. In FIG. 2, three-dimensional coordinates (UVW coordinates) are defined about the head of the user U wearing the HMD 110. A direction in which the user U stands upright is defined as a V axis, a direction being orthogonal to the V axis and connecting the center of the display unit 112 and the user U is defined as a W axis, and a direction orthogonal to the V axis and the W axis is defined as a U axis. The position sensor 130 and/or the HMD sensor 114 are/is configured to detect angles about the respective UVW axes (that is, inclinations determined by a yaw angle representing the rotation about the V axis, a pitch angle representing the rotation about the U axis, and a roll angle representing the rotation about the W axis). The control device 120 is configured to determine angular information for controlling a visual axis of the virtual camera, which is configured to define visual-field information, based on the detected change in angles about the respective uvw axes.

Figure 3:
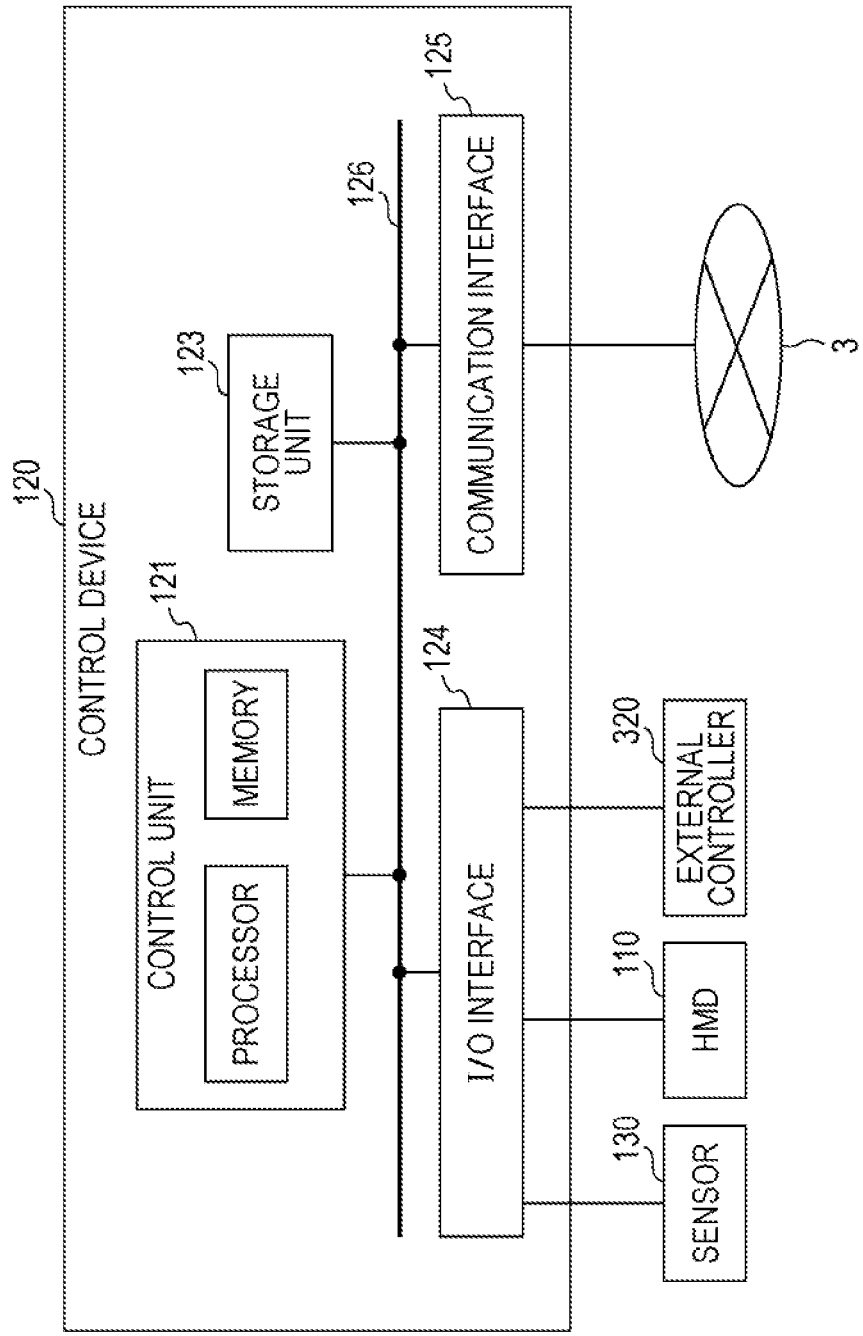
FIG. 3 A diagram of a hardware configuration of a control device according to at least one embodiment of this disclosure.

Next, with reference to FIG. 3, a hardware configuration of the control device 120 is described. FIG. 3 is a diagram of a hardware configuration of the control device 120 according to at least one embodiment of this disclosure. In FIG. 3, the control device 120 includes a control unit 121, a storage unit 123, an input/output (I/O) interface 124, a communication interface 125, and a bus 126. The control unit 121, the storage unit 123, the I/O interface 124, and the communication interface 125 are connected to each other via the bus 126 so as to enable communication therebetween.

The control device 120 may be constructed as a personal computer, a tablet computer, or a wearable device separately from the HMD 110, or may be built into the HMD 110. Further, hardware for executing a part of the functions of the control device 120 may be mounted in the HMD 110, and hardware for executing other functions of the control device 120 may be mounted in another device separate from the HMD 110.

The control unit 121 includes a memory and a processor. The memory is constructed of, for example, a read only memory (ROM) having various programs and the like stored therein and a random access memory (RAM) having a plurality of work areas in which various programs to be executed by the processor are stored. The processor is constructed of, for example, a central processing unit (CPU), a micro processing unit (MPU) and/or a graphics processing unit (GPU), and is configured to develop, on the RAM, programs designated by various programs installed into the ROM to execute various types of processing in cooperation with the RAM.

In particular, the control unit 121 may control various operations of the control device 120 by causing the processor to develop, on the RAM, a display control program (to be described later) for executing the display control method according to the first embodiment on a computer to execute the program in cooperation with the RAM. The control unit 121 executes a predetermined application (game program) stored in the memory or the storage unit 123 to provide a virtual space (visual-field image) on the display unit 112 of the HMD 110. With this, the user U can be immersed in the virtual space provided on the display unit 112.

The storage unit (storage) 123 is a storage device, for example, a hard disk drive (HDD), a solid state drive (SSD), or a USB flash memory, and is configured to store programs and various types of data. The display control program may be incorporated in the storage unit 123. Further, the storage unit 123 may store programs for authentication of the user and game programs including data relating to various images and objects. Further, a database including tables for managing various types of data may be constructed in the storage unit 123.

The I/O interface 124 is configured to connect each of the position sensor 130, the HMD 110, and the external controller 320 to the control device 120 so as to enable communication therebetween, and is constructed of, for example, a universal serial bus (USB) terminal, a digital visual interface (DVI) terminal, or a high-definition multimedia interface (HDMI)® terminal. The control device 120 may be wirelessly connected to each of the position sensor 130, the HMD 110, and the external controller 320.

The communication interface 125 is configured to connect the control device 120 to a communication network 3, for example, a local area network (LAN), a wide area network (WAN), or the Internet. The communication interface 125 includes various wire connection terminals and various processing circuits for wireless connection for communication to/from an external device via the communication network 3, and is configured to adapt to communication standards for communication via the communication network 3.

Figure 4:
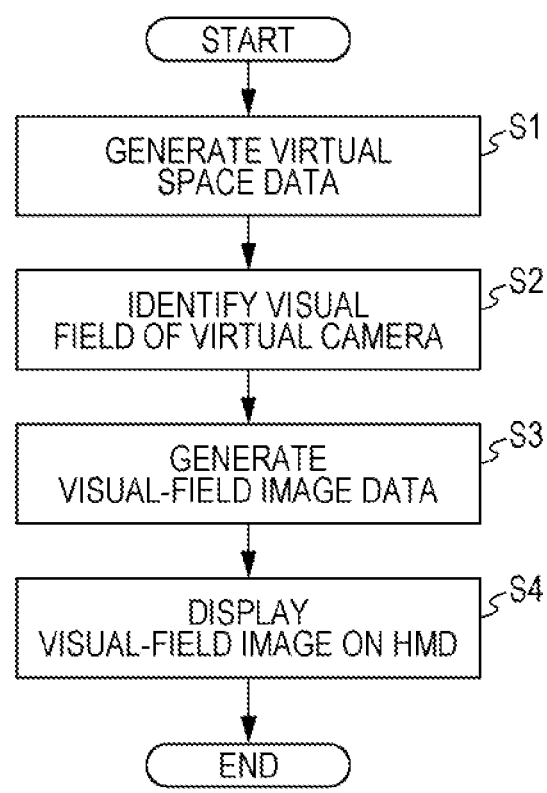
FIG. 4 A flowchart of a method of displaying a visual-field image on the HMD according to at least one embodiment of this disclosure.
Figure 5:
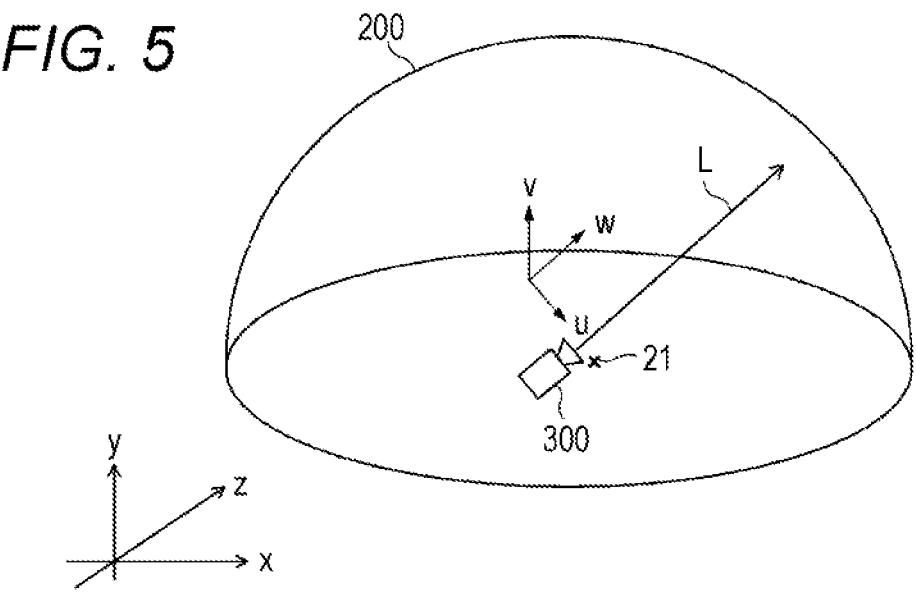
FIG. 5 An xyz spatial diagram of a virtual space according to at least one embodiment of this disclosure.
Figure 6A:
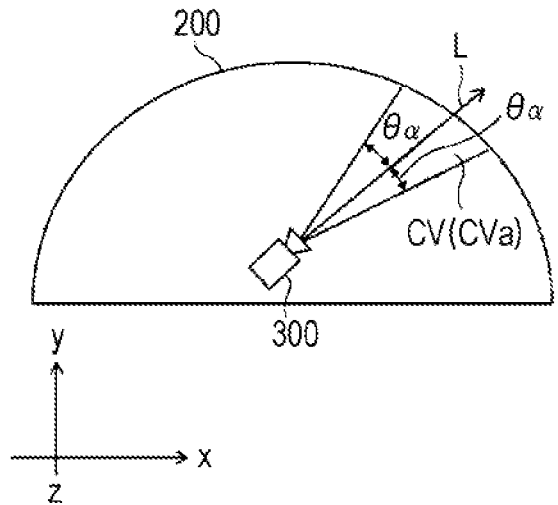
FIG. 6A A yx plane diagram of a virtual space according to at least one embodiment of this disclosure.
Figure 6B:
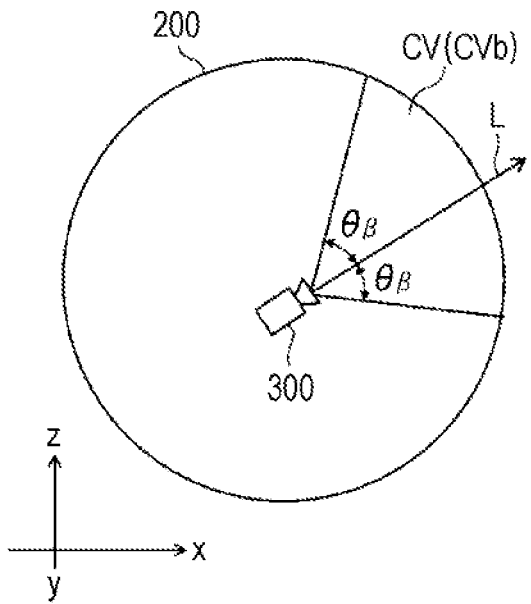
FIG. 6B A zx plane diagram of a virtual space according to at least one embodiment of this disclosure.

Next, with reference to FIG. 4 to FIG. 6, processing for displaying a visual-field image on the HMD 110 is described. FIG. 4 is a flow chart of a method of displaying the visual-field image on the HMD 110 according to at least one embodiment of this disclosure. FIG. 5 is a spatial diagram for illustrating an example of a virtual space 200 according to at least one embodiment of this disclosure. FIG. 6A is a yx plane diagram of the virtual space 200 according to at least one embodiment of this disclosure. FIG. 6B is a zx plane diagram of the virtual space 200 according to at least one embodiment of this disclosure.

In FIG. 4, in Step S1, the control unit 121 (refer to FIG. 3) generates virtual space data defining the virtual space 200 in which a virtual camera 300 is included. In FIG. 5, FIG. 6A and FIG. 6B, the virtual space 200 is defined as an entire celestial sphere having a center position 21 as the center (in FIG. 5, FIG. 6A and FIG. 6B, only the upper-half celestial sphere is shown for simplicity). Further, in the virtual space 200, an XYZ coordinate system having the center position 21 as the origin is set. In an initial state of the HMD system 1, the virtual camera 300 is arranged at the center position 21 of the virtual space 200. The UVW coordinate system that defines the visual field of the virtual camera 300 is determined so as to synchronize with the UVW coordinate system that is defined about the head of the user U in the real space. Further, the virtual camera 300 may be moved in the virtual space 200 in synchronization with the movement of the user U wearing the HMD 110 in the real space.

Next, in Step S2, the control unit 121 identifies a visual field CV (refer to FIGS. 6A and 6B) of the virtual camera 300. Specifically, the control unit 121 acquires information relating to the position and the inclination of the HMD 110 based on data representing the state of the HMD 110, which is transmitted from the position sensor 130 and/or the HMD sensor 114. Next, the control unit 121 determines the position and the direction of the virtual camera 300 in the virtual space 200 based on the information relating to the position and the inclination of the HMD 110. Next, the control unit 121 determines a reference line of sight L corresponding to the visual axis of the virtual camera 300 based on the position and the direction of the virtual camera 300, and identifies the visual field CV of the virtual camera 300 based on the determined reference line of sight L. In this case, the visual field CV of the virtual camera 300 matches a part of the region of the virtual space 200 that can be visually recognized by the user U wearing the HMD 110 (in other words, matches a part of the region of the virtual space 200 to be displayed on the HMD 110). Further, the visual field CV has a first region CVa (refer to FIG. 6A) set as an angular range of a polar angle θα about the reference line of sight L in the xy plane, and a second region CVb (refer to FIG. 6B) set as an angular range of an azimuth angle θβ about the reference line of sight L in the xz plane.

As described above, the control unit 121 can identify the visual field CV of the virtual camera 300 based on the data transmitted from the position sensor 130 and/or the HMD sensor 114. In at least one embodiment, when the user U wearing the HMD 110 moves, the control unit 121 can identify the visual field CV of the virtual camera 300 based on the data representing the movement of the HMD 110, which is transmitted from the position sensor 130 and/or the HMD sensor 114. That is, the control unit 121 can move the visual field CV along with movement of the HMD 110.

Next, in Step S3, the control unit 121 generates visual-field image data representing the visual-field image to be displayed on the display unit 112 of the HMD 110. Specifically, the control unit 121 generates the visual-field image data based on the virtual space data defining the virtual space 200 and the visual field CV of the virtual camera 300. That is, the visual field CV of the virtual camera 300 determines the range of virtual space data to be rendered as visual-field image data.

Next, in Step S4, the control unit 121 displays the visual-field image on the display unit 112 of the HMD 110 based on the visual-field image data. As described above, the visual field CV of the virtual camera 300 changes in accordance with the movement of the user U wearing the HMD 110, and thus a visual-field image V to be displayed on the HMD 110 changes as well. Thus, the user U can be immersed in the virtual space 200.

Figure 7:
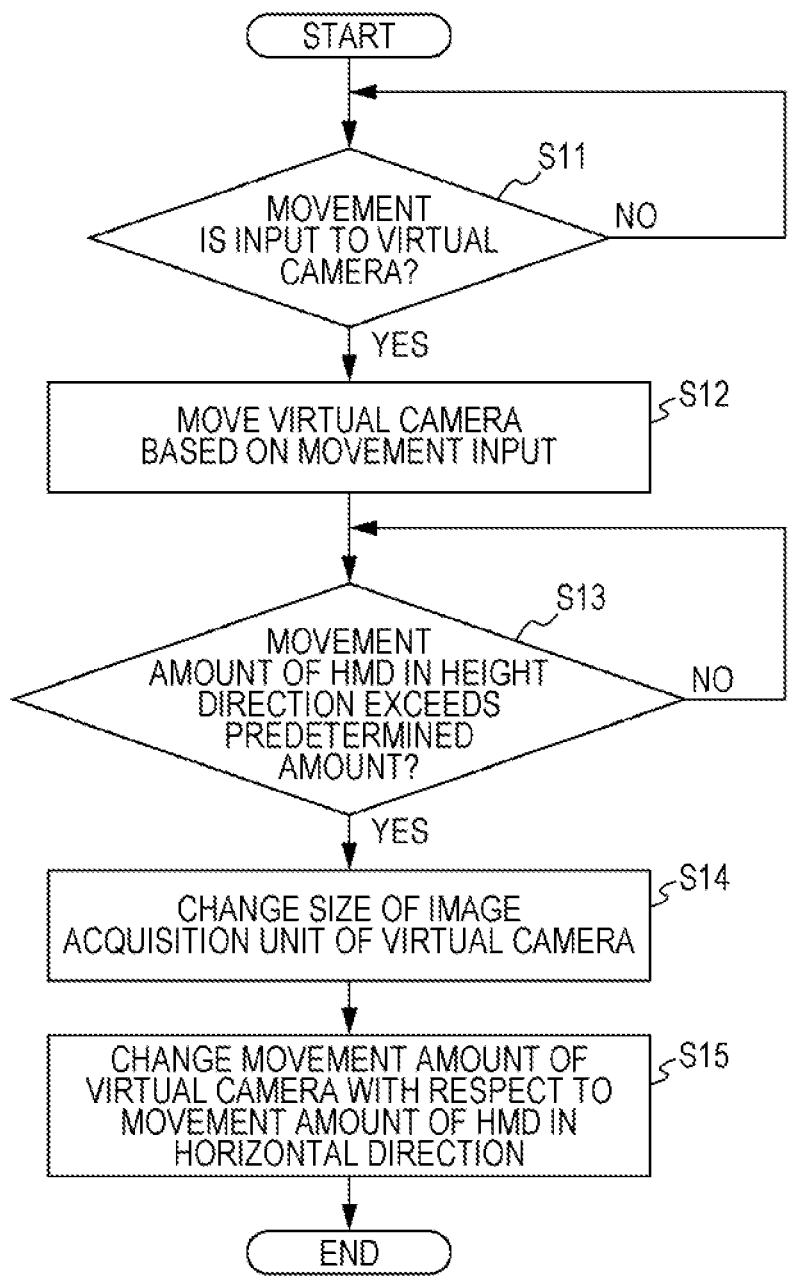
FIG. 7 A flowchart of a method of changing a viewpoint of a virtual camera according to at least one embodiment of this disclosure.
Figure 10:
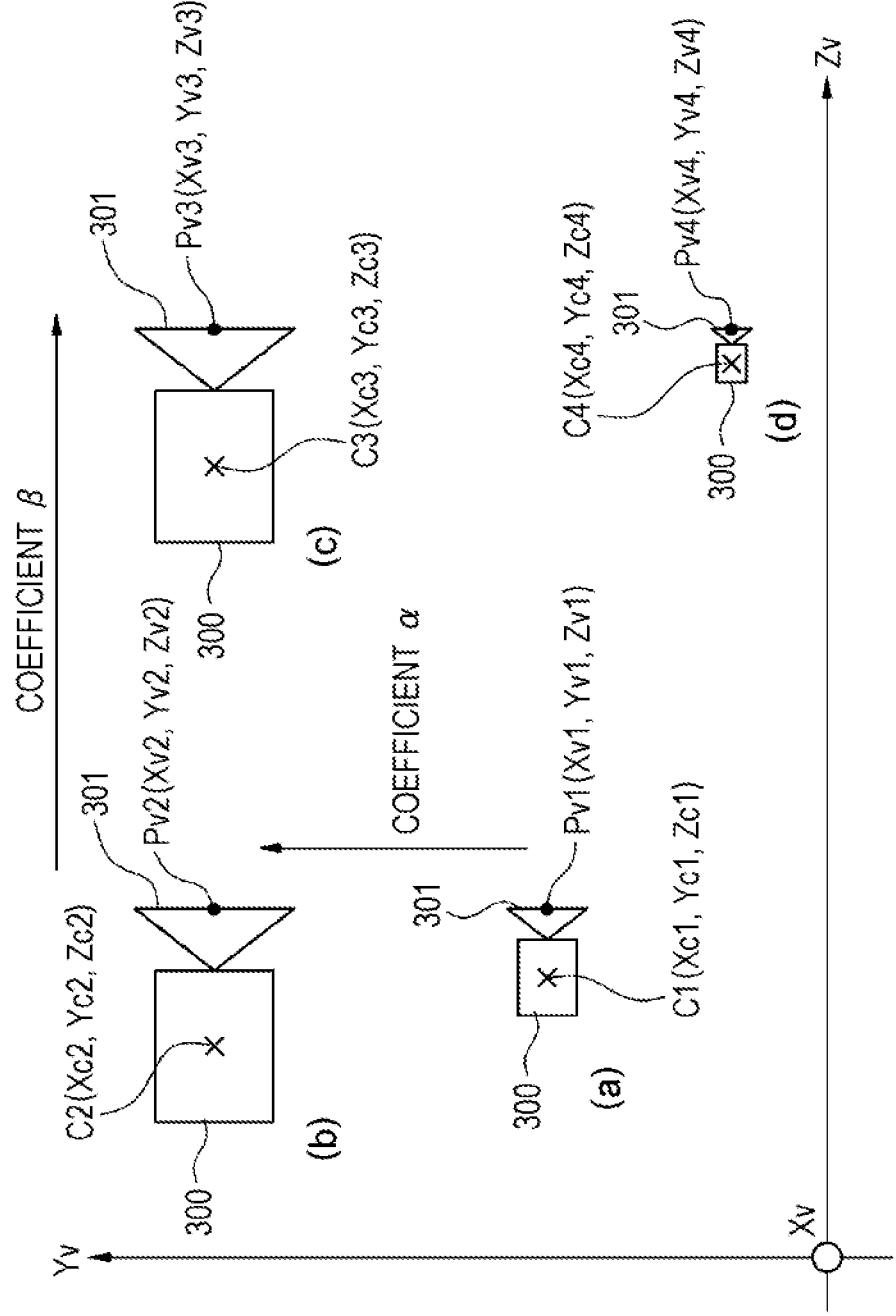
FIG. 10 A diagram of coordinates of the virtual camera in the virtual space in accordance with movement of the HMD in a real space according to at least one embodiment of this disclosure.

Next, a description is given of an example of processing of changing the viewpoint of the virtual camera 300 in accordance with upward/downward movement of the HMD 110 with reference to FIG. 7 to FIG. 11. FIG. 7 is a flowchart of a method of changing the viewpoint of the virtual camera 300 according to at least one embodiment of this disclosure. FIG. 8 is a diagram of changing the viewpoint in the virtual space 200 according to at least one embodiment of this disclosure. In FIG. 8, an object (e.g., building object) OB is arranged at a predetermined position in the virtual space 200. FIG. 9A is a diagram of coordinates for the HMD in accordance with a position of the user wearing the HMD according to at least one embodiment of this disclosure. FIG. 9B is a diagram of coordinates for the HMD in accordance with a position of the user wearing the HMD according to at least one embodiment of this disclosure. FIG. 9C is a diagram of coordinates for the HMD in accordance with a position of the user wearing the HMD according to at least one embodiment of this disclosure. FIG. 9D is a diagram of coordinates for the HMD in accordance with a position of the user wearing the HMD according to at least one embodiment of this disclosure. FIGS. 9A-9D include changes in coordinates of the HMD 110 corresponding to movement of the user U wearing the HMD 1, namely, positional change of the HMD 1 in the real space. In FIGS. 9A-D, UVW coordinates in FIG. 2 are defined as Xr/Yr/Zr coordinates. FIG. 10 is a diagram of coordinates of the virtual camera 300 in the virtual space 200 in accordance with movement of the HMD 1 in the real space according to at least one embodiment of this disclosure. In FIG. 10, XYZ coordinates in, for example, FIG. 5, are defined as Xv/Yv/Zv coordinates.

In FIG. 9A, for example, the user U sits on a chair and wears the HMD 110 to experience a three-dimensional image. In this manner, the viewpoint of the user U defined by the visual field CV of the virtual camera 300 in the virtual space 200 when the user U is sitting is defined as, for example, a normal viewpoint NV (see FIG. 8).

In FIG. 7, in Step S11, the control unit 121 determines whether or not the user U wearing the HMD 110 has moved, or whether or not an operation for moving the virtual camera 300 is input from the controller 320. That is, the control unit 121 determines whether or not to move the virtual camera 300 in virtual space 200. Then, when the control unit 121 determines that movement is input to the virtual camera 300 (Yes in Step S11), in Step S12, the control unit 121 moves the virtual camera 300 in the virtual space 200 based on the movement input.

Next, in Step S13, the control unit 121 determines whether or not the upward/downward (Yr-axis direction of FIGS. 9A-D) movement amount of the HMD 110 exceeds a predetermined amount. For example, when the user U changes from the sitting state (see FIG. 9A) to a standing state (see FIG. 9B), the position of the HMD 110 changes from coordinates Pr1 (Xr1, Yr1, Zr1) to coordinates Pr2 (Xr2, Yr2, Zr2) in the real space. When the movement amount of the HMD 110 in the Yr-axis direction is represented by ΔYr and the movement amount in the Zr-axis direction is represented by ΔXr, the coordinates (Yr2, Zr2) of the HMD 110 are represented by the following expressions.

(Math. 1)

$$Yr2 = Yr1 + \Delta Yr \qquad \text{(Expression 1)}$$

(Math. 2)

$$Zr2 = Zr1 + \Delta Zr \qquad \text{(Expression 2)}$$

In this manner, when the HMD 110 has moved and the movement amount of the HMD 110 in the Yr-axis direction is determined to exceed a predetermined threshold value (Yes in Step S13), the control unit 121 associates the movement of the HMD 110 in the Yr-axis direction in the real space with the movement of the virtual camera 300 in the Yv-axis direction in the virtual space 200. The movement amount of the virtual camera 300 in the Yv-axis direction that corresponds to the movement amount of the HMD 110 is represented by the following expression.

(Math. 3)

$$Yv2 = Yv1 + \Delta Yr * \alpha \qquad \text{(Expression 3)}$$

In Expression (3), the coefficient α is a coefficient that is determined based on movement of the HMD 110 in the Yr-axis direction, and may be, for example, a previously defined value that changes depending on various kinds of games to which the display control method according to the at least one embodiment is applied. Further, a plurality of threshold values corresponding to the movement amount of the HMD 110 in the Yr-axis direction may be provided, and different values of the coefficient α may be set for respective threshold values. In at least one embodiment, the coefficient α is adjustable based on a user preference, such as bodily features.

Figure 11:
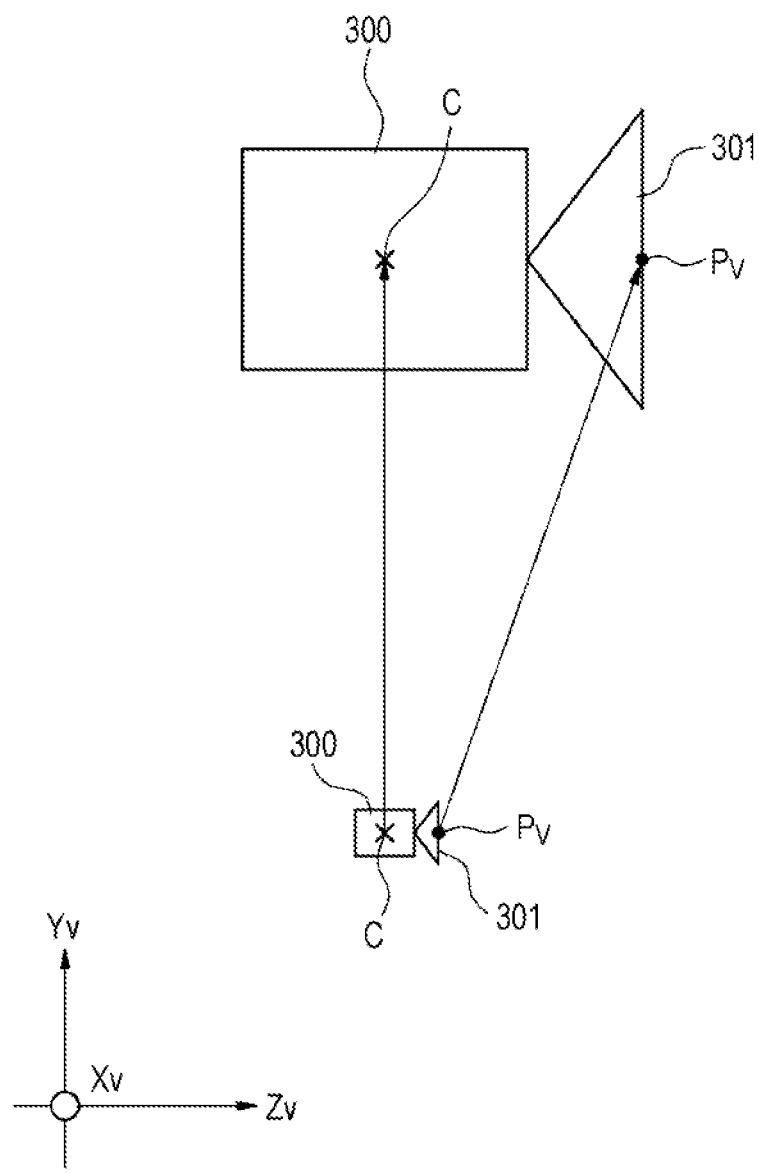
FIG. 11 A diagram of changing the size of the virtual camera according to at least one embodiment of this disclosure.

Then, in Step S14, the control unit 121 changes the size of the virtual camera 300 (in particular, image acquisition unit 301 of virtual camera 300; refer to FIGS. 10 and 11). The configuration of the image acquisition unit 301 is not limited to a specific configuration as long as the image acquisition unit 301 is capable of defining the visual field CV determined by the position or direction of the virtual camera 300. However, in at least one embodiment, for the sake of simplicity of description, the description is based on the assumption that the image acquisition unit 301 indicates, for example, a part corresponding to a virtual surface of a virtual lens of the virtual camera 300 in FIG. 10 and FIG. 11.

In FIG. 11, the size of the virtual camera 300 may be changed in accordance with movement of the virtual camera 300 in the Yv-axis direction without changing the position of central coordinates C of the virtual camera 300 in the visual-axis direction (Zv-axis direction). However, in this case, for example, a viewpoint Pv of the virtual camera 300 defined as the center of the image acquisition unit 301 changes in the Zv-axis direction along with magnification of the virtual camera 300. Thus, as indicated by the change from position (a) in FIG. 10 to position (b) in FIG. 10, in at least one embodiment, the position of the central coordinates C of the virtual camera 300 is corrected even when the size of the virtual camera 300 changes such that the viewpoint Pv of the virtual camera 300 does not change in the visual-axis direction. In view of this change of the size of the virtual camera, in Step S14, the control unit 121 corrects the central coordinates C of the virtual camera 300 so as to keep Zv2=Zv1 while magnifying the virtual camera 300. Specifically, the control unit 121 corrects the central coordinates C of the virtual camera 300 by cancelling an error ΔZv' of the viewpoint Pv in the Zv-axis direction that occurs along with magnification of the virtual camera 300. The central coordinates C in the Zv-axis direction are represented by the following expression.

(Math. 4)

$$Zc2=Zc1-\Delta Zv' \qquad \text{(Expression 4)}$$

Further, ΔZr, which is a movement amount of the HMD 110 from the coordinate Zr1 to the coordinate Zr2, needs to be compensated for in order to keep Zv2=Zv1. The movement amount ΔZv of the viewpoint Pv of the virtual camera 300 in the Zv-axis direction in the virtual space is represented by the following expression.

(Math. 5)

$$\Delta Zv=\Delta Zr*\beta=\Delta Zr*Yc*t \qquad \text{(Expression 5)}$$

In Expression (5), the coefficient t represents a change ratio of the magnification scale of the virtual camera 300 with respect to the upward/downward position (height position) of the virtual camera 300. According to Expression (5), as the virtual camera 300 moves to the higher position, namely, as the magnification scale of the virtual camera 300 becomes larger, the value of the coefficient β becomes larger. As a result, the change amount of ΔZv with respect to the movement amount of the HMD 110 becomes larger. Therefore, the control unit 121 corrects the central coordinates C of the virtual camera 300 in the Zv-axis direction so as to satisfy the following expression additionally.

(Math. 6)

$$Zc2=Zc1-\Delta Zv'-\Delta Zr*\beta \qquad \text{(Expression 6)}$$

In this manner, the central coordinates C of the virtual camera 300 in the Zv-axis direction can be corrected to suppress change of the viewpoint position Pv of the virtual camera 300 in the visual-axis direction, and unnatural change of the visual-field image can be reduced or prevented.

Figure 12B:
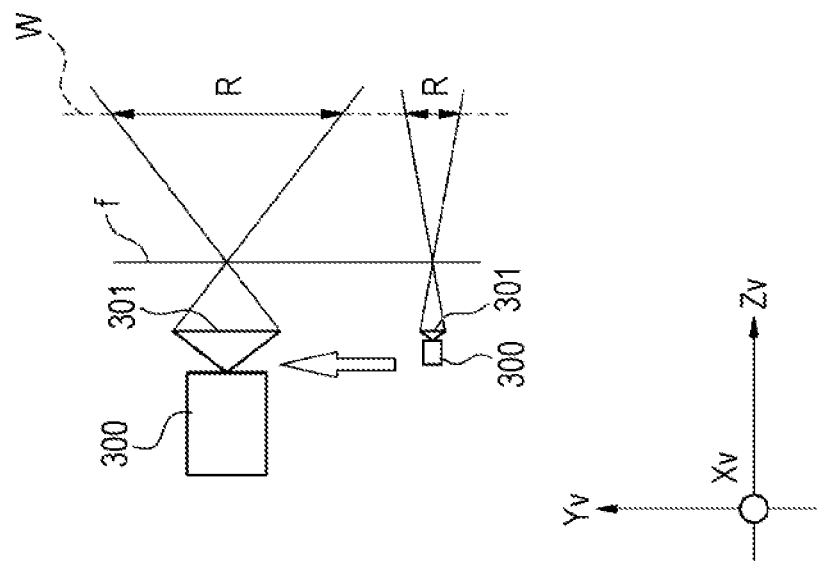
FIG. 12B Diagram of a mode of changing a rendering range of the virtual camera according to at least one embodiment of this disclosure.
Figure 12A:
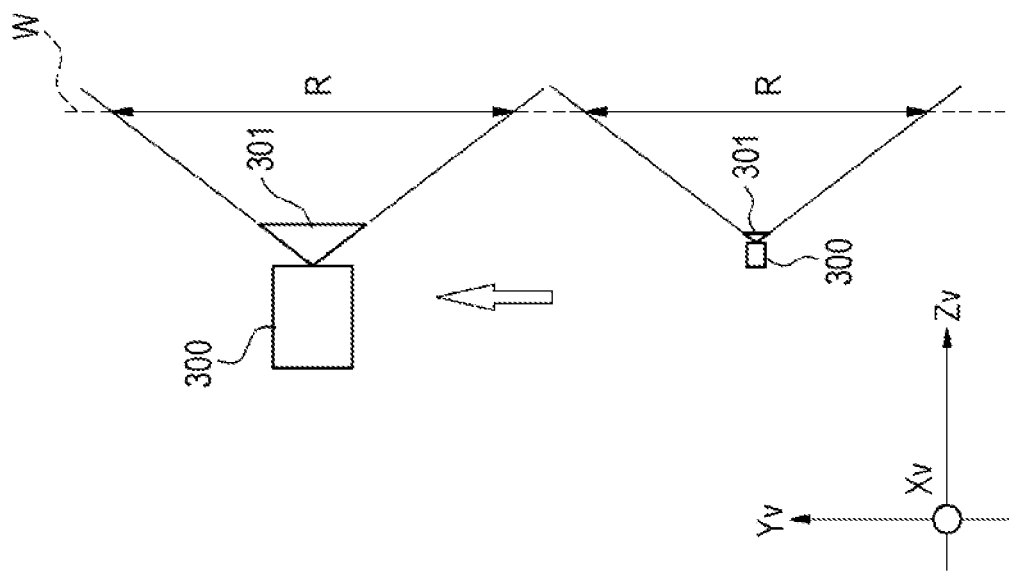
FIG. 12A Diagram of a mode of changing a rendering range of the virtual camera according to at least one embodiment of this disclosure.

When the size of the virtual camera 300 is changed in accordance with movement of the virtual camera 300 in the Yv-axis direction, as in FIGS. 12A and 12B, the rendering range of the virtual camera 300 can be changed. The "rendering range" is defined as a range of the visual-field image that can be acquired by the image acquisition unit 301 on a virtual screen W, which is separated in the visual-axis direction of the virtual camera 300 by a predetermined distance, namely, a range of the virtual space that is rendered by the virtual camera 300 for visual recognition by user U. For example, in FIGS. 12A and 12B, in a case where the image acquisition unit 301 is assumed to have a triangular pyramid shape and a vertex of the triangular pyramid is defined as a focal point of the virtual camera 300, when the virtual camera 300 is magnified without changing the viewpoint position Pv in the visual-axis direction of the virtual camera 300, a distance from the focal point of the virtual camera 300 to the virtual screen W increases. As a result, the rendering range on the virtual screen W can be increased.

In FIG. 12B, the image acquisition unit 301 of the virtual camera 300 may be defined as the one equivalent to an image pickup surface of an image pickup element, and a focal point f may be defined to exist at a predetermined point between the virtual camera 300 and the virtual screen W. In this case, as the area of the image acquisition unit 301 equivalent to the image pickup surface increases, the rendering range can be enlarged.

Further, through change of a polar angle θα (refer to FIG. 6A) and an azimuth angle θβ (refer to FIG. 6B), that is, through change of the field angle of the virtual camera 300, the rendering range may be enlarged without changing the area of the image acquisition unit 301.

Figure 13A:
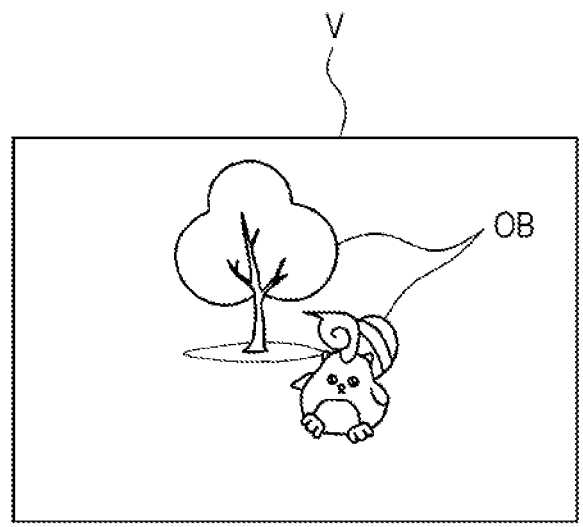
FIG. 13A A diagram of the visual-field images from a normal viewpoint according to at least one embodiment of this disclosure.
Figure 13B:
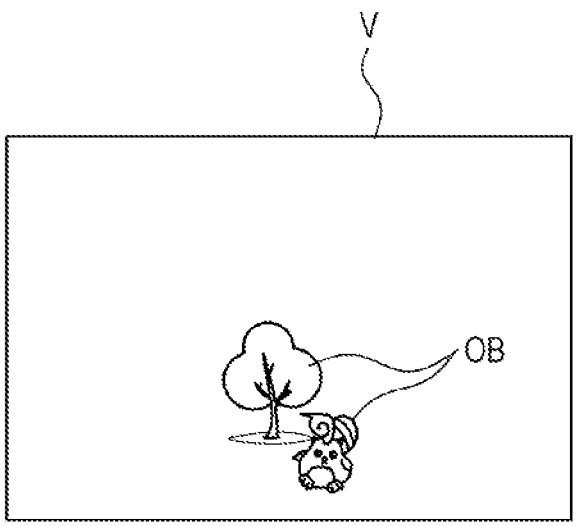
FIG. 13B A diagram of the visual-field images from a giant's viewpoint according to at least one embodiment of this disclosure.

In this manner, as in FIG. 8, the viewpoint of the user U can be switched from the normal viewpoint NV to the giant's viewpoint GV by changing the rendering range of the virtual camera 300 in accordance with upward/downward (Yv-axis direction) change in position of the virtual camera 300. With this, updating display of the visual-field image V from the visual-field image V from the normal viewpoint NV to the visual-field image V from the giant's view point GV is possible. FIG. 13A is a diagram of the visual-field image V from the normal viewpoint NV according to at least one embodiment of this disclosure. FIG. 13B is a diagram of the visual-field image V from the giant's viewpoint GV according to at least one embodiment of this disclosure. The object OB displayed in the normal viewpoint NV is larger than the object OB displayed in the giant's viewpoint GV.

When the viewpoint of the virtual camera 300 is switched from the normal viewpoint NV to the giant's viewpoint GV, in Step S15, the control unit 121 changes the movement amount of the virtual camera 300 with respect to the movement amount of the HMD 110 in the horizontal direction. For example, as in FIG. 9C, when the user U moves in the Zr direction, the position of the virtual camera 300 is moved so as to satisfy the following expression in accordance with movement of the HMD 110 in the real space.

(Math. 7)

$$Zv3 = Zv2 + \Delta Zv = Zv2 + \Delta Zr*\beta = Zv2 + \Delta Zr*Yc*t \quad \text{(Expression 7)}$$

In this manner, as the virtual camera 300 moves to a higher position, the change amount of ΔZv with respect to ΔZr of the HMD 110 becomes larger. Thus, as in FIG. 8, while the control unit 121 is instructing the HMD 110 to display visual-field image in the giant's viewpoint GV, moving farther while overlooking the virtual space 200 when an operation of moving the virtual camera 300 in the horizontal direction is input, in comparison with a visual-field image in the normal viewpoint NV, is possible.

Next, when the user U bends down as in FIG. 9D, an operation that is opposite to the one when the user U stands up, see for example a change from the user position in FIG. 9A to FIG. 9B. In the real space, the viewpoint position of the user U moves in accordance with "Zr4=Zr3+ΔZr, Yr4=Yr3+ΔYr (ΔYr is a minus value)". Thus, the control unit 121 associates movement of the HMD 110 in the Yr-axis direction with movement of the virtual camera 300 in the Yv-axis direction so as to satisfy "Yv4=Yv3+ΔYr*α". Further, the control unit 121 corrects the position of the virtual camera 300 in the Zv-axis direction so as to satisfy "Zc4=Zc3−ΔZv'−ΔZr*β" to keep Zv4=Zv3.

In this manner, according to at least one embodiment, when the upward/downward movement amount of the HMD 110 exceeds the predetermined amount, the control unit 121 changes the size of the image acquisition unit 301 of the virtual camera 300 to change the rendering range of the virtual camera 300. At the same time, the control unit 121 changes the movement amount of the virtual camera 300 with respect to the movement amount of the HMD 110 in the horizontal direction. With this, switching the viewpoint from the normal viewpoint NV to the giant's viewpoint GV more intuitively in comparison with other approaches is possible. Therefore, providing a visual-field image enabling the user to feel more immersed in the visual-field image is achievable.

Further, the control unit 121 corrects the central coordinates C of the virtual camera 300 such that the position of the viewpoint Pv of the virtual camera 300 in the visual-axis direction does not change before and after switching of the viewpoint, namely, before and after change of the rendering range. With this, even when the size of the virtual camera 300 changes, the viewpoint Pv of the virtual camera 300 does not change, resulting in prevention of unnatural change of the visual-field image V.

Further, in order to achieve various types of processing to be executed by the control unit 121, a display control program for executing a display control method of at least one embodiment on a computer (processor) may be installed in advance into the storage unit 123 or the ROM. Alternatively, the display control program may be stored in a computer-readable storage medium, for example, a magnetic disk (HDD, a floppy disk), an optical disc (e.g., CD-ROM, DVD-ROM, and Blu-ray disc), a magneto-optical disk (e.g., MO), and a flash memory (e.g., an SD card, a USB memory, and an SSD). In this case, the storage medium is connected to the control device 120, and thus the program stored in the storage medium is installed into the storage unit 123. Then, the display control program installed in the storage unit 123 is loaded onto the RAM, and the processor executes the loaded program. In this manner, the control unit 121 executes the display control method of at least one embodiment.

Further, the display control program may be downloaded from a computer on the communication network 3 via the communication interface 125. Also in this case, the downloaded program is similarly installed into the storage unit 123.

In FIG. 10 and FIG. 11, the size of the image acquisition unit 301 of the virtual camera 300 is changed in accordance with upward/downward movement of the HMD 110 to change the rendering range of the virtual camera 300. However, the configuration is not limited to this example. For example, in at least one embodiment of this disclosure, the virtual camera may include a left-eye virtual camera 300L and a right-eye virtual camera 300R having different viewpoint positions (refer to FIG. 14A). In this case, the control unit 121 generates left-eye visual-field image data based on the virtual space data and the visual field of the left-eye virtual camera 300L, and generates right-eye visual-field image data based on the virtual space data and the visual field of the right-eye virtual camera 300R. Then, the control unit 121 displays a left-eye visual-field image based on the left-eye visual-field image data acquired by the left-eye virtual camera and a right-eye visual-field image on the display unit 112 of the HMD 110 based on the right-eye visual-field image data acquired by the right-eye virtual camera. With these separate virtual cameras, the user U can recognize the visual-field image as a three-dimensional image.

Figure 14A:
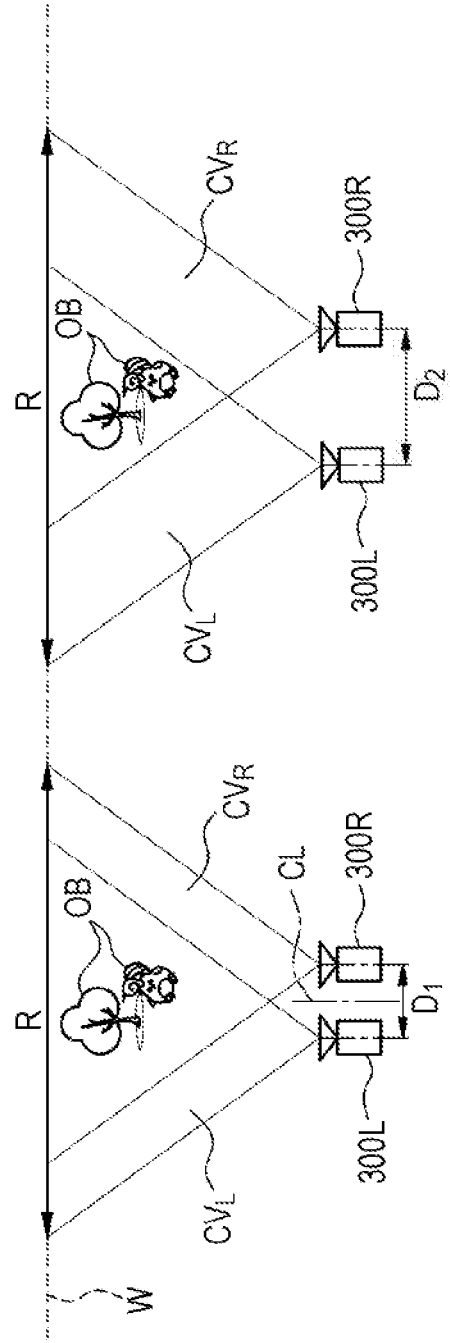
FIG. 14A A diagram of an arrangement of the virtual camera relative to an object in the virtual space according to at least one embodiment of this disclosure.
Figure 14B:
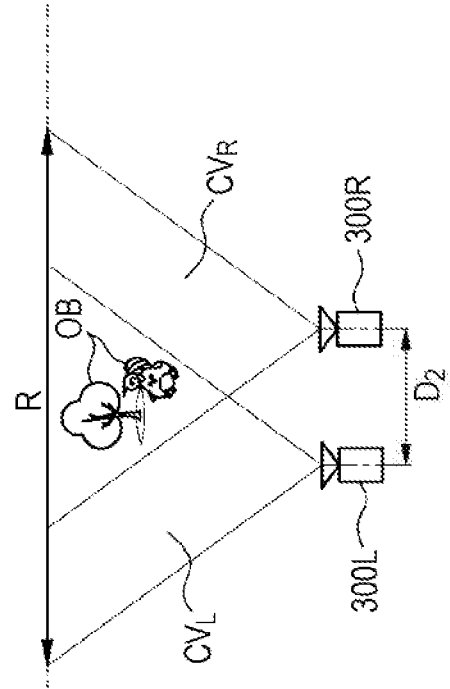
FIG. 14B A diagram of an arrangement of the virtual camera relative to an object in the virtual space according to at least one embodiment of this disclosure.
Figure 14C:
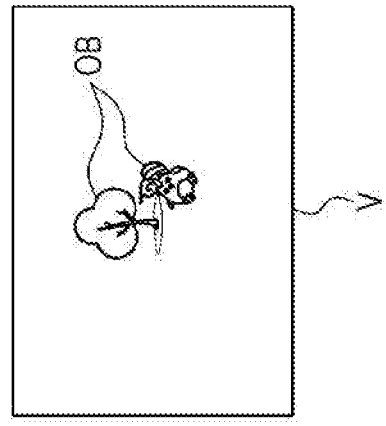
FIG. 14C A diagram of the visual-field image based on the virtual camera location of FIG. 14A according to at least one embodiment of this disclosure.
Figure 14D:
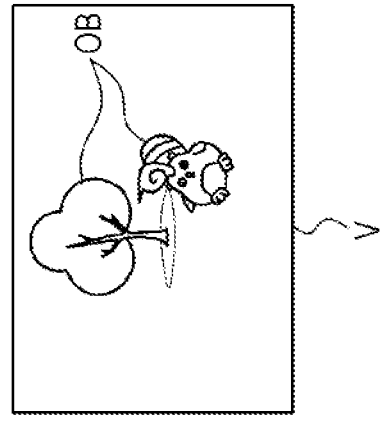
FIG. 14D A diagram of the visual-field image based on the virtual camera location of FIG. 14B according to at least one embodiment of this disclosure.

In at least one embodiment, in Step S14 of FIG. 7, instead of changing the size of the image acquisition unit of the virtual camera, the control unit 121 changes the distance between the left-eye virtual camera 300L and the right-eye virtual camera 300R. For example, FIG. 14A includes a distance D1 between the left-eye virtual camera 300L and the right-eye virtual camera 300R. In comparison, FIG. 14B includes a distance D2 between the left-eye virtual camera 300L and the right-eye virtual camera 300R. Distance D2 is different from distance D1. When the detected upward movement amount of the HMD 110 exceeds the predetermined amount, the control unit 121 increases the distance between the left-eye virtual camera 300L and the right-eye virtual camera 300R. When the detected downward movement amount of the HMD 110 exceeds the predetermined amount, the control unit 121 decreases the distance between the left-eye virtual camera 300L and the right-eye virtual camera 300R. For example, when a distance D1 between a center line of the left-eye virtual camera 300L and a center line of the right-eye virtual camera 300R, as in FIG. 14A, is increased to a distance D2 as in FIG. 14B, the relative positions of the visual field CV L of the left-eye virtual camera 300L and the visual field CV R of the right-eye virtual camera 300R change. With this change in distance, the size of the range (rendering range R in FIGS. 14A-B) of the visual-field image rendered on the virtual screen W by the left-eye virtual camera 300L and the right-eye virtual camera 300R can be changed in left/right directions. The rendering range R in this case is not a range rendered by one of left and right virtual cameras, but is a range of a visual field that can actually be recognized by the user U by combining the ranges rendered by both of the left-eye virtual camera 300L and the right-eye virtual camera 300R. That is, through increase of the distance between the left-eye virtual camera 300L and the right-eye virtual camera 300R, the rendering range R is increased in the left/right directions. In this manner, for example, updating display of the visual-field image V from the visual-field image V from the normal viewpoint NV illustrated in FIG. 14C to the visual-field image V from the giant's viewpoint GV in FIG. 14D is possible.

The storage unit 123 may store an attribute information table, such as an attribute information table in FIG. 15. FIG. 15 is an attribute information table stored in a storage unit according to at least one embodiment of this disclosure. The attribute information table contains information on, for example, a character ID associated with each player character, a character attribute, a distance between left and right cameras, and a parts attribute. The character attribute is information mainly on a physical size of a player character, and has classifications of, for example, "small size", "medium size", and "large size". The distance between the left and right virtual cameras is set depending on the character attribute. For example, when the attribute of the player character is "medium size", the distance (interval between left and right cameras) between the left-eye virtual camera 300L and the right-eye virtual camera 300R is set as, for example, 50 mm. When the attribute of the player character is "small size", the interval between the left and right cameras is set smaller (for example, 50−α1) than that of "medium size". On the contrary, when the attribute of the player character is "large size", the interval between the left and right cameras is set larger (for example, 50+α2) than that of "medium size". The parts attribute represents an attribute of parts worn by the player character. For example, when the player character (character attribute is "medium size") of a character ID of 004 wears parts of a "large size" attribute, the interval between the left and right cameras is set larger (for example, 50+α3) than that of a player character of a normal "medium size" attribute.

The control unit 121 can read attribute information on the player character selected by the user U from the attribute information table stored in the storage unit 123, and change the distance between the left-eye virtual camera 300L and the right-eye virtual camera 300R based on the read attribute information. That is, changing the viewpoint based on, for example, the attribute of a player character without synchronizing with movement of the HMD 110 is possible. With this controlled changing of the distance between the left-eye virtual camera 300L and the right-eye virtual camera 300R, the user U can enjoy an image from the viewpoint associated with the player character selected by the user U.

Figure 16:
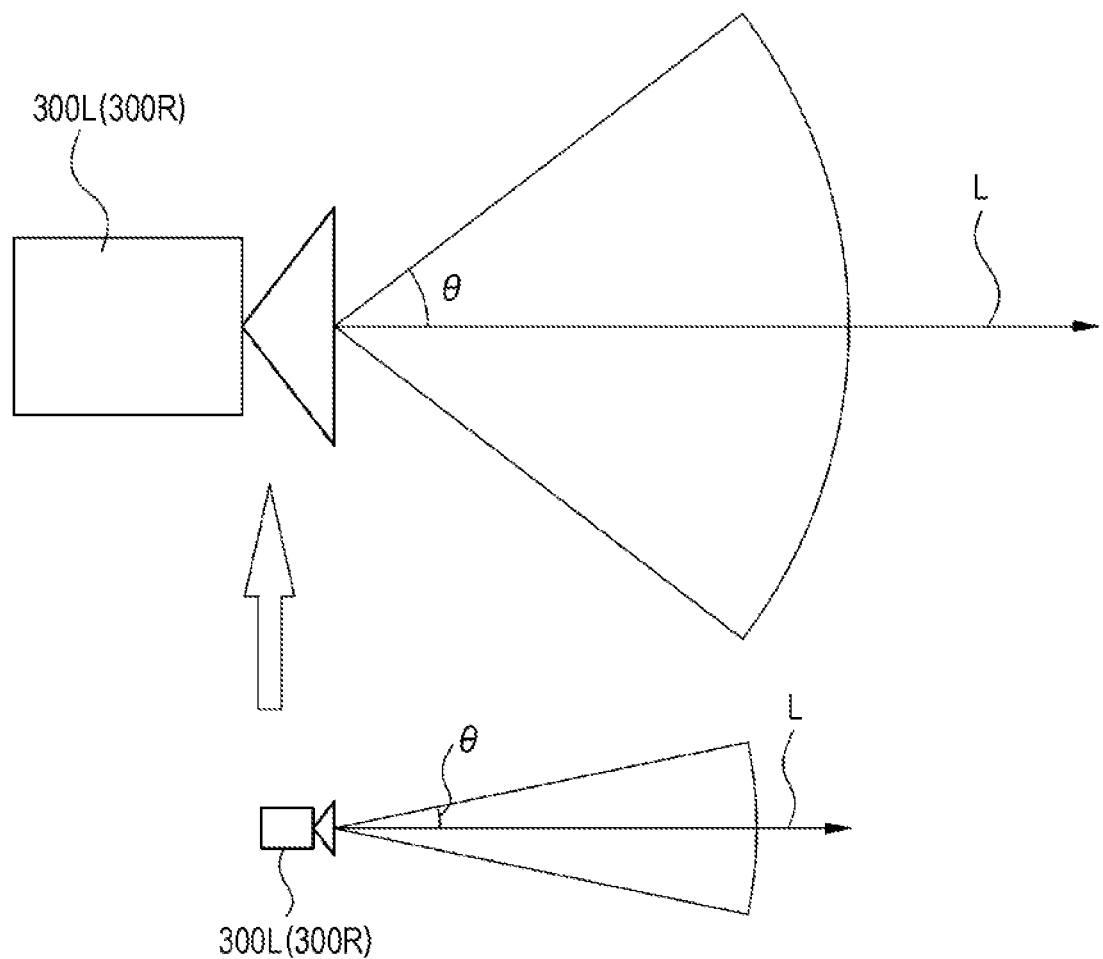
FIG. 16 A diagram of a mode of changing a field angle of the virtual camera according to at least one embodiment of this disclosure.

Further, in FIG. 15, the attribute information table may further contain information on the field angles of the respective virtual cameras 300L and 300R. For example, when the attribute of a player character is "medium size", the field angles of the respective virtual cameras 300L and 300R are set as, for example 60°. When the attribute of a player character is "small size", the field angles are set smaller (for example, 60°−β1) than those of the "medium size", and when the attribute of a player character is "large size", the field angles are set larger (for example, 60°+β2) than those of the "medium size". In FIG. 16, the field angles can be changed by changing the angle θ of the visual field from a reference line of sight L of the left and right virtual cameras 300L (300R). In this manner, through increase of the distance between the left-eye virtual camera 300L and the right-eye virtual camera 300R and increase of the field angles of the respective virtual cameras 300L and 300R, changing the viewpoint more intuitively and naturally in comparison with other approaches is possible.

Instead of changing the field angle, the sizes of the respective image acquisition units 301L and 301R of the left and right virtual cameras 300L and 300R may be changed. At this time, for example, the left-eye virtual camera 300L and the right-eye virtual camera 300R may be treated as one component, and the virtual cameras 300L and 300R may be magnified with reference to the center line CL (refer to FIG. 14A) between the left-eye virtual camera 300L and the right-eye virtual camera 300R. With this change in size, increasing the distance between the left-eye virtual camera 300L and the right-eye virtual camera 300R, and realizing magnification of the rendering ranges of the respective virtual cameras 300L and 300R is possible.

Figure 17B:
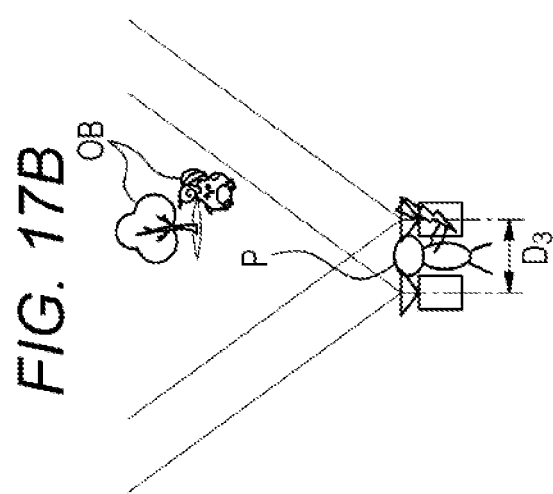
FIG. 17B A diagram of arranging the virtual camera in the virtual space from a third-person viewpoint according to at least one embodiment of this disclosure.
Figure 17D:
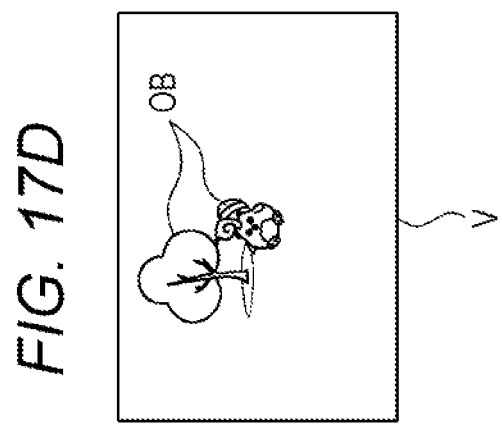
FIG. 17D A diagram of a visual-field image with the virtual camera arrangement of FIG. 17B according to at least one embodiment of this disclosure.
Figure 17A:
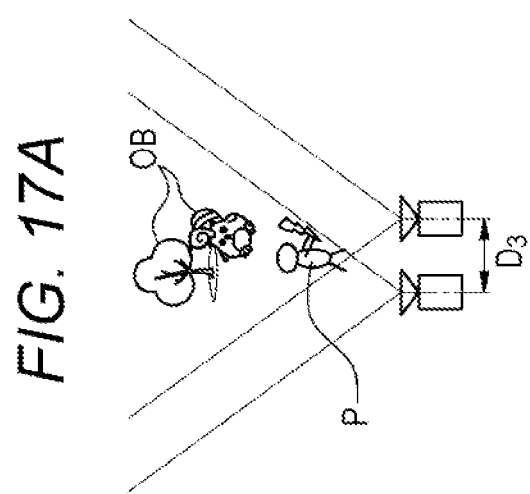
FIG. 17A A diagram of arranging the virtual camera in the virtual space from a first-person viewpoint according to at least one embodiment of this disclosure.
Figure 17C:
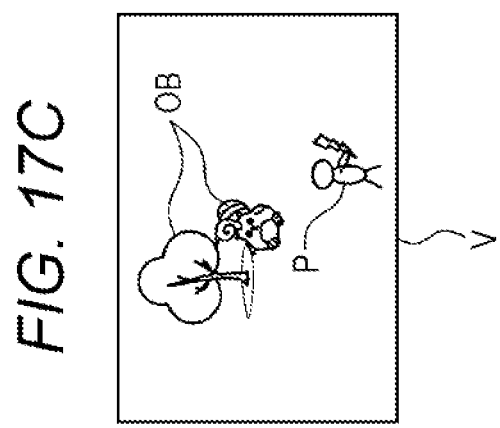
FIG. 17C A diagram of a visual-field image with the virtual camera arrangement of FIG. 17A according to at least one embodiment of this disclosure.

Further, in FIG. 15, the attribute information table may further contain information on a camera setting for the first-person viewpoint and information on a camera setting for the third-person viewpoint. The settings of the respective virtual cameras 300L and 300R from the first-person viewpoint of each player character are the same as the settings of the respective virtual cameras 300L and 300R from the third-person viewpoint of the player character (when player character of character ID of 001 at first-person viewpoint has setting A, same player character at third-person viewpoint has setting A' that is substantially same as setting A). Specifically, as in FIGS. 17A and 17B, in at least one embodiment, a distance D3 between the left and right virtual cameras 300L and 300R of a player character P at the first-person viewpoint be the same as the interval D3 between the left and right virtual cameras 300L and 300R of the same player character P at the third-person viewpoint. With this change in viewpoint, the visual-field image V is displayed on the display unit 112 of the HMD 110 with the visual-field image V being the same before and after change of from the first-person viewpoint (refer to FIG. 17C) to the third-person viewpoint (refer to FIG. 17D; with display position of object OB substantially unchanged). Thus, the user U can enjoy the visual-field image V from the viewpoint associated with the attribute of each player character P.

In this manner, according to at least one embodiment, for example, when a predetermined condition, for example, a condition on the upward/downward movement of the HMD 110 and attribute information, is satisfied, the control unit 121 changes the distance between the left-eye virtual camera 300L and the right-eye virtual camera 300R, to thereby change the range (rendering range R) of the virtual space rendered by both the virtual cameras and output the left-eye visual-field image acquired by the left-eye virtual camera 300L and the right-eye visual-field image acquired by the right-eye virtual camera 300R to the HMD 110. With this, providing various kinds of experiences to the user using the HMD system 1 is possible.

Item (1)

A display control method, which is executed by a system comprising a head-mounted device. The display control method includes generating virtual space data for defining a virtual space containing a virtual camera including a left-eye virtual camera and a right-eye virtual camera. The method further includes displaying a visual-field image on the head-mounted device based on a visual field of the virtual camera and the virtual space data. The method further includes changing a range of the virtual space rendered by the virtual camera by changing a distance between the left-eye virtual camera and the right-eye virtual camera when a predetermined condition is satisfied. The method further includes outputting a left-eye visual-field image acquired by the left-eye virtual camera and a right-eye visual-field image acquired by the right-eye virtual camera to the head-mounted device.

According to the method described above, providing various kinds of experiences to a user using the head-mounted device is possible.

Item (2)

The predetermined condition may include such a condition that the distance is increased when an upward movement amount of the head-mounted device exceeds a predetermined amount and the distance is decreased when a downward movement amount of the head-mounted device exceeds a predetermined amount.

According to the method described above, a range of a visual field can be changed more intuitively, and thus providing a visual-field image enabling the user to feel more immersed in the visual-field image is possible.

Item (3)

The predetermined condition may include a condition on attribute information on a player character selected by a user wearing the head-mounted device, and the distance may be changed based on the attribute.

According to the method described above, the user can enjoy an image from a viewpoint associated with the selected player character.

Item (4)

The distance at a first-person viewpoint of the player character may be the same as the distance at a third-person viewpoint of the player character.

According to the method described above, even when the first-person viewpoint is changed to the third-person viewpoint, the user can enjoy an image from a viewpoint associated with an attribute of each player character.

Item (5)

The above described method may further include a step of changing respective sizes of image acquisition units of the left-eye virtual camera and the right-eye virtual camera depending on change in the distance.

Item (6)

The above described method may further include a step of changing respective field angles of the left-eye virtual camera and the right-eye virtual camera.

According to those methods, changing a range of the visual field more intuitively in comparison with other approaches is possible.

Item (7)

A system according to at least one embodiment of this disclosure is for executing the display control method of any one of Items (1) to (6).

According to this configuration, the system is capable of providing various kinds of experiences to the user using the head-mounted device.

The above description is not to be read as a restrictive interpretation of the technical scope of this disclosure. The embodiments are merely given as examples, and it is to be understood by a person skilled in the art that various modifications can be made to the embodiments within the scope of this disclosure set forth in the appended claims. Thus, the technical scope of this disclosure is to be defined based on the scope of this disclosure set forth in the appended claims and an equivalent scope thereof.

The invention claimed is:

1. A method, comprising:
defining a three-dimensional virtual space including a virtual camera;
displaying a visual-field image on a head-mounted device based on a visual field of the virtual camera;
updating the visual-field image in response to a detected movement of the head-mounted device;
changing a size attribute of a user in the virtual space in response to a predetermined condition being satisfied;
updating the visual-field image in response to changing the size attribute of the user in the virtual space;
defining a center position of the virtual camera in the three-dimensional virtual space; defining a position of an image acquisition unit of the virtual camera for defining the rendering range in the three-dimensional virtual space;
changing a position of the image acquisition unit in response to changing the size attribute of the virtual camera;
correcting the center position of the virtual camera for maintaining the position of the image acquisition unit in a visual-axis direction of the virtual camera constant during the updating of the visual-field image.

2. The method according to claim 1, further comprising:
defining a center position of the virtual camera in the three-dimensional virtual space;
moving the center position of the virtual camera in response to the detected movement amount of the head-mounted device;
changing movement amount of the center position of the virtual camera in response to changing a scale of the virtual camera.

3. The method according to claim 1, further comprising:
specifying a character associated with the virtual camera in the three-dimensional virtual space;
specifying attribute information of the character;
defining the distance between the left-eye virtual camera and the right-eye virtual camera based on the attribute information.

4. The method according to claim 1, further comprising:
defining a first-person viewpoint of a character associated with the virtual camera in the three-dimensional virtual space;
defining a third-person viewpoint of the character associated with the virtual camera in the three-dimensional virtual space; and
changing a viewpoint of the virtual camera from the first-person viewpoint to the third-person viewpoint when the predetermined condition is satisfied.

5. The method according to claim 1, wherein the predetermined condition comprises detected movement of the head-mounted device in a direction parallel to a user standing up direction exceeds a threshold.

6. The method according to claim 1, wherein the generating virtual space data comprises defining a virtual camera in the three-dimensional virtual space, and the display control method further comprises:
moving, prior to the updating of the visual-field image, the virtual camera in a direction parallel to a visual axis of the virtual camera in response to a second detected movement of the head-mounted device.

7. The method according to claim 6, further comprising moving, after the updating of the visual-field image, the virtual camera in a direction parallel to a visual axis of the virtual camera in response to a third detected movement of the head-mounted device.

8. The method of claim 7, wherein a ratio between a distance moved in the virtual space in response to the second detected movement and a magnitude of the second detected movement is different from a ratio between a distance moved in the virtual space in response to the third detected movement and a magnitude of the third detected movement.

9. The method according to claim 1, wherein
the virtual camera is defined as comprising a left virtual camera and a right virtual camera in the three-dimensional virtual space, and
updating the visual-field image comprises changing a distance between the left virtual camera and the right virtual camera.

10. A display control method, for execution by a system comprising a head-mounted device, the display control method comprising:
  generating virtual space data for defining a three-dimensional virtual space;
  defining a virtual camera in the three-dimensional virtual space;
  displaying a visual-field image on the head-mounted device based on a field of view of the virtual camera;
  updating the visual-field image in response to a detected movement of the head-mounted device exceeding a threshold, wherein updating the visual-field image comprises changing a size attribute of a user in the virtual space while maintaining a location of a center point of the virtual camera in the three-dimensional virtual space;
  defining a center position of the virtual camera in the three-dimensional virtual space;
defining a position of an image acquisition unit of the virtual camera for defining the rendering range in the three-dimensional virtual space;
  changing a position of the image acquisition unit in response to changing the size attribute of the virtual camera;
  correcting the center position of the virtual camera for maintaining the position of the image acquisition unit in a visual-axis direction of the virtual camera constant during the updating of the visual-field image.

11. A method, comprising:
  defining a three-dimensional virtual space including a virtual camera, wherein the virtual camera comprises a left-eye virtual camera and a right-eye virtual camera;
  displaying a visual-field image on a head-mounted device based on a visual field of the virtual camera;
  updating the visual-field image in response to a detected movement of the head-mounted device;
  defining a center position of the virtual camera in the three-dimensional virtual space;
defining a position of an image acquisition unit of the virtual camera for defining the rendering range in the three-dimensional virtual space;
  changing a position of the image acquisition unit in response to changing a size attribute of the virtual camera;
  correcting the center position of the virtual camera for maintaining the position of the image acquisition unit in a visual-axis direction of the virtual camera constant during the updating of the visual-field image; and
  changing a distance between the left-eye virtual camera and the right-eye virtual camera in response to a predetermined condition, wherein
  the predetermined condition comprises changing the size attribute of a user in the virtual space.

12. The method according to claim 11, further comprising:
  changing, when the predetermined condition is satisfied, a viewpoint of the left-eye virtual camera and the right-eye virtual camera from a first-person viewpoint for a character in the three-dimensional virtual space to a third-person viewpoint for the character.

13. The method according to claim 11, further comprising detecting movement of the head-mounted device in a direction parallel to a user standing up direction via a sensor in the head-mounted device.

14. The method according to claim 11, further comprising:
  defining a virtual camera in the three-dimensional virtual space, and
  moving, prior to the updating of the visual-field image, the virtual camera in a direction parallel to a visual axis of the virtual camera in response to a second detected movement of the head-mounted device.

15. The method according to claim 14, further comprising:
  moving, after the updating of the visual-field image, the virtual camera in a direction parallel to a visual axis of the virtual camera in response to a third detected movement of the head-mounted device.

16. The method of claim 15, wherein a ratio between a distance moved in the virtual space in response to the second detected movement and a magnitude of the second detected movement is different from a ratio between a distance moved in the virtual space in response to the third detected movement and a magnitude of the third detected movement.

17. The method according to claim 11, further comprising:
  defining a virtual camera in the three-dimensional virtual space, and
  correcting coordinates of the virtual camera such that a center position of the virtual camera in a visual-axis direction remains constant during the updating of the visual-field image.

18. The method according to claim 11, further comprising:
  defining a virtual camera in the three-dimensional virtual space, and
  moving the virtual camera with respect to a movement amount of the head-mounted device in a first direction perpendicular to an upward/downward direction in the three-dimensional virtual space, when an angular range is adjusted based on attribute information for a user or for the head-mounted device.

19. A display control method, for execution by a system comprising a head-mounted device, the display control method comprising:
  generating virtual space data for defining a three-dimensional virtual space;
  defining a virtual camera comprising a left virtual camera and a right virtual camera in the three-dimensional virtual space;
  displaying a visual-field image on the head-mounted device based on a field of view of the virtual camera;
  defining a center position of the virtual camera in the three-dimensional virtual space;
defining a position of an image acquisition unit of the virtual camera for defining the rendering range in the three-dimensional virtual space;
  changing a position of the image acquisition unit in response to changing a size attribute of the virtual camera;
  correcting the center position of the virtual camera for maintaining the position of the image acquisition unit in a visual-axis direction of the virtual camera constant during the updating of the visual-field image; and
  updating the visual-field image in response to a detected movement of the head-mounted device exceeding a threshold, wherein
  updating the visual-field image comprises changing a distance between the left virtual camera and the right virtual camera and changing the size attribute of a user in the virtual space.

* * * * *